United States Patent [19]

Umehara et al.

[11] Patent Number: 4,490,815

[45] Date of Patent: Dec. 25, 1984

[54] ACTUATOR FOR USE IN A PICKUP DEVICE FOR A VIDEO DISK PLAYER

[75] Inventors: Teruo Umehara, Hanyu; Norio Matsumoto, Kumagaya, both of Japan

[73] Assignee: Hitachi Metals, Ltd., Tokyo, Japan

[21] Appl. No.: 316,642

[22] Filed: Oct. 30, 1981

[30] Foreign Application Priority Data

Nov. 5, 1980 [JP] Japan ................................ 55-155320
Apr. 17, 1981 [JP] Japan ............................ 56-55636[U]

[51] Int. Cl.³ ......................... G11B 9/06; G11B 21/12; H01F 7/08

[52] U.S. Cl. ....................................... 369/43; 335/234; 335/256; 369/126

[58] Field of Search ................................ 369/126, 43; 360/DIG. 1, 77–78; 358/342; 335/229–230, 234, 250, 255–257, 266, 277–279

[56] References Cited

U.S. PATENT DOCUMENTS 2,435,817 2/1948 Boynton et al. .................... 335/256
3,135,880 6/1964 Olson et al. ......................... 335/256
3,183,410 11/1965 Flora .................................. 335/256
3,202,886 8/1965 Kramer ............................. 335/234
3,504,315 3/1970 Stanwell ............................ 335/234
3,593,241 7/1971 Ludwig .............................. 335/278

FOREIGN PATENT DOCUMENTS 958501 5/1964 United Kingdom .

*Primary Examiner*—Raymond F. Cardillo, Jr.
*Attorney, Agent, or Firm*—Antonelli, Terry & Wands

[57] ABSTRACT

An actuator for use in a pickup device for a video disk plunger having a cylindrical yoke made of a soft magnetic material, a pair of tubular solenoid coils disposed in said yoke such that the same polarity appears at adjacent portions thereof, and a movable element disposed axially movably inside of the tubular solenoid coils, the movable element having an axially magnetized permanent magnet and pole shoes attached to both ends of the permanent magnet. Dampers made of a resilient material such as a butyl rubber are secured to both ends of the yoke. The dampers support projections projected from both ends of the movable element such that the projections project axially outwardly of the dampers. A permanent magnet for magnetically attracting a stylus is secured to the outer end of one of the projections.

14 Claims, 9 Drawing Figures

ACTUATOR FOR USE IN A PICKUP DEVICE FOR A VIDEO DISK PLAYER

BACKGROUND OF THE INVENTION

1. Field of the Invention

The present invention relates to an actuator for use in controlling a stylus attached to the end of a pickup arm of a video disk player and other uses, and, more particularly, to an actuator of movable magnet type.

2. Description of the Prior Art

The video disk system can be broadly sorted into two types: namely a contact read out type system represented by an electrostatic system and a noncontact read out type system represented by an optical system.

The most popular system of contact read out type incorporates a disk having a tracking groove along which a stylus is fed, and the signal is detected as a change in the capacitance between the contacting surface of the stylus and the disc surface. A pickup device for a video disk player used in combination with the video disk having tracking grooves comprises a pickup means including cantilever, a stylus tip provided at one end of the cantilever (which is called a "readout end"), a thin conductive electrode tip attached to the stylus tip and a magnetic disk plate attached to the other end of the cantilever, and an actuator which is disposed adjacent to the magnetic disk plate magnetically coupled thereto for actuating the cantilever to compensate the stylus position in a jitter direction. Although the surface of the groove in the disc is smooth macroscopically, this surface has a number of microscopic convexities and concavities so that the relative velocity between the disc and the stylus is changed undesirably in the direction of the jitter. To compensate for this change, an error signal is applied to the actuator to move the cantilever in the direction of the jitter.

An example of this kind of actuator is shown in FIG. 2 of the Japanese patent application Laid-open No. 4154/1974. This actuator has a stationary yoke in which are fixed pole shoes and a permanent magnet, and a solenoid coil is disposed in the magnetic gap of the yoke. The solenoid coil itself is moved back and forth as it is selectively energized. This type of actuator is generally referred to as "moving coil type actuator" and is finding wide use. The moving coil type actuator, however, has an extremely low efficiency of transformation of energy. In addition, it is difficult to obtain a sufficiently high reliability of the construction of the electric power feeder for feeding the electric power to the movable solenoid coil.

SUMMARY OF THE INVENTION

Accordingly, an object of the present invention is to provide an actuator for use in a pickup device for a video disk player capable of eliminating the above-mentioned drawbacks of the prior art.

Another object of the invention is to provide an actuator for video disk capable of transforming the energy at a high efficiency while attaining a high reliability and linearity of the operation characteristics.

To this end, according to the present invention, there is provided an actuator for use in a pickup device for a video disk player comprising: a cylindrical yoke made of a soft magnetic material; a pair of tubular solenoid coils disposed in the cylindrical yoke such that same polarity appears at adjacent portions thereof; and a movable element disposed to be axially movably in the tubular solenoid coils, the movable element including an axially magnetized permanent magnet and pole shoes attached to both ends of the permanent magnet, wherein the improvement comprises projections projected extending from both ends of the movable element, and resilient members attached to both ends of the yoke respectively, the projections being supported by the resilient members such that the ends of the projections extend outwardly from the resilient members.

DESCRIPTION OF THE PREFERRED EMBODIMENTS

Preferred embodiments of the invention will be described hereinunder with reference to the accompanying drawings.

Figure 1:
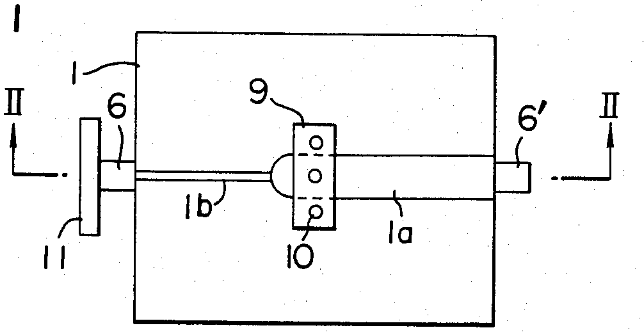
FIG. 1 is a plan view of an actuator constructed in accordance with an embodiment of the present invention.
Figure 2:
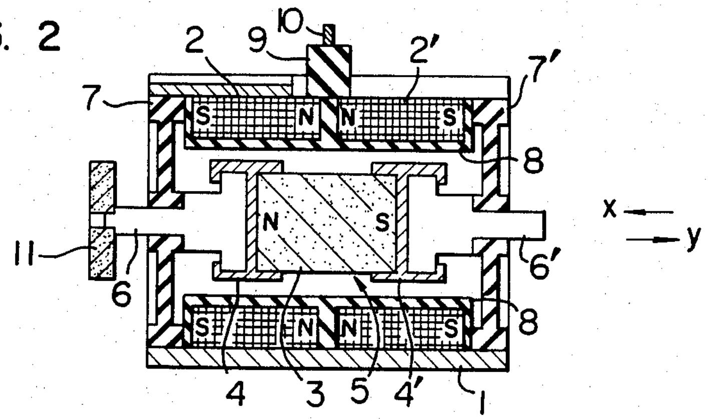
FIG. 2 is a sectional view taken along the line II—II of FIG. 1.

Referring to FIGS. 1 and 2, a cylindrical yoke 1 made of a soft magnetic material receives a pair of solenoid coils 2, 2′ accommodated by a coil bobbin 8 in such a manner that the same polarity is generated at adjacent portions thereof. These solenoid coils 2, 2′ may be connected electrically in parallel or in series to each other. A movable element 5 disposed inside of the solenoid coils 2, 2′ is constituted by an axially magnetized permanent magnet 3 and pole shoes 4, 4′ attached to both ends of the permanent magnet 3 respectively. Projections 6, 6′ are formed on both ends of the movable element 5 to project axially outwardly therefrom. Dampers 7, 7 made of a resilient material are secured to both ends of the yoke 1 respectively. The projections 6, 6′ are resiliently supported by these dampers 7, 7′. A permanent magnet 11 for magnetically attracting a stylus is attached to the outer end of one of the projections.

This actuator operates in a manner explained hereinunder.

The N and S magnetic poles of the movable element 5 produce a magnetic flux which penetrates the pole shoes 4, 4′ to interact with the solenoid coils 2, 2′. Then, as the solenoid coils 2, 2′ are energized to generate polarities as illustrated in FIG. 2, a thrust force as indicated by an arrow (x) is formed between the solenoid coils and the magnetic flux interacting therewith. In consequence, the projection 6 is moved in the direction of the arrow (x) while deflecting the damper 7.

To the contrary, as the solenoid coils 2, 2′ are energized to generate polarities opposite to those illustrated, the thrust force is generated in the direction of an arrow (y) so that the projection 6' is moved in the direction of the arrow (y) while deflecting the damper 7'.

The thrust force is generated mainly in accordance with the Fleming left-hand rule, so that it is possible to obtain a high linearity of the operation characteristics. In addition, the efficiency of transformation of energy is high enough because the entire part of the solenoid coils is utilized for the transformation of the energy.

In the actuator shown in FIG. 1, the coils are secured to the yoke in a manner explained below. A groove 1*a* is formed in the peripheral surface of the yoke 1. A terminal member 9 having a terminal pin 10 fixed thereon is secured to the groove 1*a* by means of an adhesive or the like means. Then, the bobbin 8 made of an insulating material, into which the coils 2, 2' are inserted beforehand, is inserted into the yoke 1. Then, the coils 2, 2' are connected to the pin 10.

Figure 3:
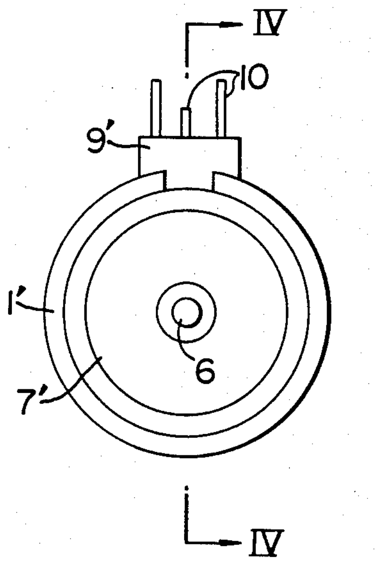
FIG. 3 is a side elevational view of an actuator constructed in accordance with another embodiment of the present invention.
Figure 4:
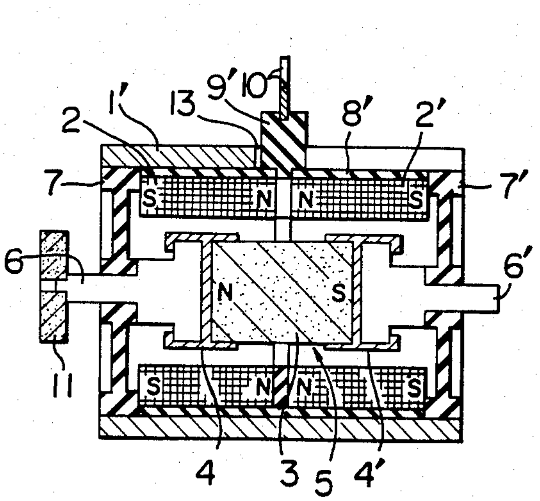
FIG. 4 is a sectional view taken along the line IV—IV of FIG. 3.

FIGS. 3 and 4 show an actuator in accordance with another embodiment of the invention having a construction materially identical to that shown in FIGS. 1 and 2 except that the bobbin used therein has a terminal block attached thereto. This actuator is assembled in the following procedure.

Figure 5:
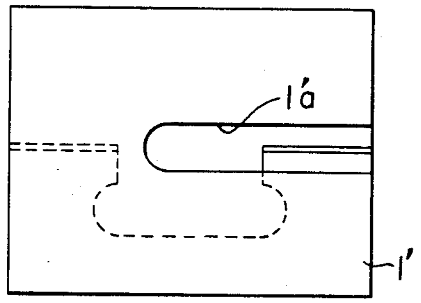
FIG. 5 is a plan view of a yoke shown in FIG. 4.
Figure 6:
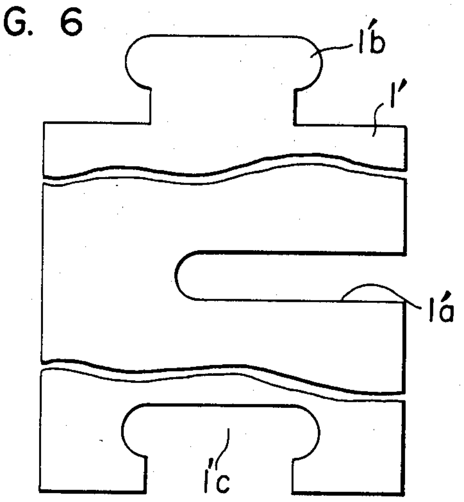
FIG. 6 is an evolutional view of the yoke shown in FIG. 5.
Figure 7:
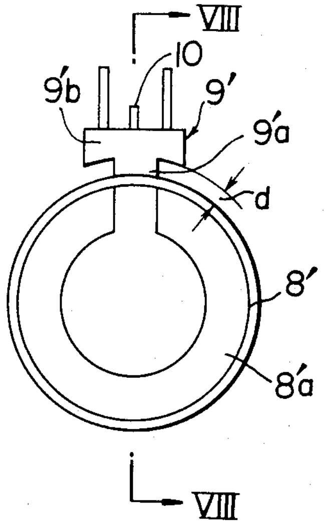
FIG. 7 is a front elevational view of a coil bobbin incorporated in the yoke shown in FIG. 4.
Figure 8:
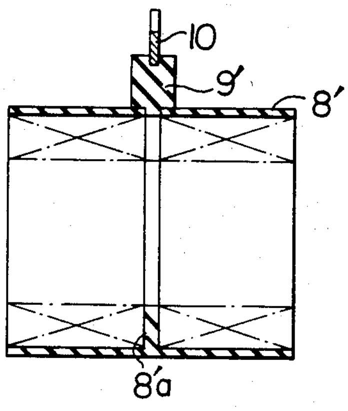
FIG. 8 is a sectional view taken along the line VIII—VIII of FIG. 7.

This actuator has a yoke 1' shown in FIGS. 5 and 6. The yoke 1' is formed by preparing a sheet material provided at its center portion with a recess 1'*a* and at its opposite end portions with a projection 1'*b* and a recess 1'*c*, bending the sheet material by a press or the like, fitting these end portions to form a cylindrical shape, and joining these portions by welding or the like. The actuator 1' incorporates also a coil bobbin 8' having a terminal block 9' as shown in FIGS. 7 and 8. More specifically, FIG. 7 is a front elevational view, while FIG. 8 is a sectional view taken along the line VIII—VIII of FIG. 7. The coil bobbin 8' has an outer diameter slightly smaller than the inner diameter of the yoke 1' and is provided at its center with a substantially ring-shaped partition 8'*a*. Furthermore, a terminal block 9' is fixed to the peripheral surface of the coil bobbin 8' to project therefrom radially outwardly.

The terminal block 9' is composed of a base portion 9'*a* and a supporting portion 9'*b*. A radial gap (d) is formed between the inner peripheral surface of the supporting portion 9'*b* and the outer peripheral surface of the bobbin 8'. The gap (d) is selected to be substantially equal to the thickness of the yoke 1'.

These parts are assembled together in the following procedure to form the actuator 1'. After passing the ends of the wire of the coils 2, 2' through a hole (not shown) provided in the terminal member 9', the coils 2, 2' together with the terminal member 9' are mounted in the coil bobbin 8' as shown by one-dot-and-dash line in FIG. 8. Thereafter, the coil bobbin 8' is inserted into and fixed to the yoke 1'. Then, the movable element 5 and the dampers 7, 7' are mounted in the yoke to complete the actuator as shown in FIGS. 3 and 4.

In the actuator of this embodiment, as will be understood from the foregoing description, the coils are beforehand mounted in the bobbin having the terminal block, and can be mounted in the yoke by a single action, so that the assembling is remarkably facilitated. In addition, since the opposing end portions of the sheet material of yoke 1' have been joined securely, it is possible to caulk the ends of the yoke 1' after the insertion of the dampers 7, 7', in order to prevent the dropping of the dampers 7, 7', without causing any damage or trouble on the yoke 1'.

The actuator for jitter is required to satisfy requirements in various characteristics such as D.C. sensitivity ($\mu$m/V), maximum displacement (mm), A.C. sensitivity ($\mu$m p-p/Vrms), stylus attracting force (gr) and resonance frequency.

Referring first to the displacement, the magnitude of the displacement is substantially in proportion to the thickness of the resilient member, i.e. the damper. Since it is generally required that the displacement be greater than $\pm 0.5$ mm, the thickness of the resilient member is selected to fall between 0.2 and 0.5 mm. The outer diameter $D_1$ of the resilient member and the diameter $D_2$ of the portion for bearing the projection are selected to be about 15 mm$\phi$ and about 5 mm$\phi$, respectively.

The resilient member, i.e. the damper, can be made of a butyl rubber or a neoprene rubber. However, the use of butyl rubber is preferred because it exhibits a change of Q which is almost a half of that of the neoprene rubber. Various butyl rubbers are available. In order to meet the requirements for D.C. sensitivity and A.C. sensitivity, butyl rubbers having a 25% modulus of 2 to 6 $Kg/cm^2$ and a restitution elasticity modulus of 7 to 21% can most suitably be used as the material of the resilient member.

The force for attracting the stylus should be at least 10 gr in the closely contacting state. To this end, it is preferred to use, as the stylus attracting permanent magnet, a magnet having a comparatively high magnetic force of 2000 Gr or higher in Br. On the other hand, the permanent magnet is required to have a small weight because it is supported by the projection provided on the movable element. Therefore, for example, an anisotropic plastic magnet is preferably used as the permanent magnet. More practically, it is possible to use a magnet constituted by ferrite particles of particle size ranging between 0.7 and 1.5 $\mu$m united and bound by a plastic material such as nylon 66.

The magnetic flux of the permanent magnet of the movable element is more or less weakened by the influence of the magnetic field created by the solenoid coils. It is, therefore, necessary to minimize the influence of the magnetic field of the solenoid coils to maintain a sufficiently large thrust force. From this point of view, it is preferred to use, as the permanent magnet, a magnet made from a rare earth metal having a large energy product and a high residual flux density. More specifically, it is desirable to use a rare earth cobalt magnet of $RCo_5$ group having an $_BHc$ value in excess of 4000 Oe. The use of this rare earth cobalt magnet is advantageous also from the view point of reduction in size and weight of the actuator.

Figure 9:
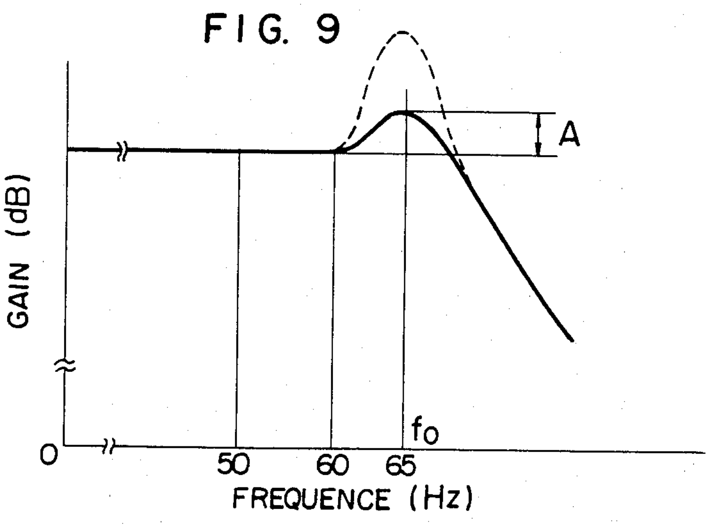
FIG. 9 is a chart showing frequency-gain characteristics.

FIG. 9 is a chart showing the frequency-gain characteristics of an actuator constructed as shown in FIG. 2 or 4 and using a rare earth cobalt magnet (HICOREX 18 by Hitachi Metals) as the permanent magnet of the movable element. From this chart, it will be seen that the frequency ($f_o$) at the resonance point is higher than the frequencies 50 Hz and 60 Hz of the commercial electric power, and that a small Q value (A), as well as a high gain, is obtained at the resonance point. The dashed line represents the characteristic using silicone rubber which is similar to neoprene rubber, and the solid line butyl rubber. In the case of using silicone rubber, the value (A) is about 9dB and in the case of butyl rubber, the value (A) is about 3 dB.

Referring to FIG. 4 again, a gap 13 is formed between the terminal block 9' and the yoke 1'. This gap plays the following role. As stated already, the movable element moves reciprocatingly in the yoke 1'. Therefore, if the inside of the yoke 1' is completely closed and isolated from the exterior, the internal pressure of the yoke 1' will be increased due to a rise in temperature to cause various troubles. This problem, however, is completely eliminated by the presence of the gap 13 which provides a communication between the interior of the yoke 1' and the ambient air.

The projections attached to the both ends of the movable element in the embodiment shown in FIGS. 2 and 4 may be formed of a plastic such as nylon 66, in order to reduce the weight of the actuator.

As will be understood from the foregoing description, the present invention offers the following advantages.

(1) It is possible to make an efficient use of the entire part of the solenoid coils for transforming the electric energy into kinetic energy for reciprocatingly driving the movable element. Consequently, a high coefficient of energy transformation is achieved.

(2) It is possible to obtain a high linearity of operation characteristics, because the thrust force is given in accordance with the Fleming left-hand rule.

(3) The construction is highly reliable because the electric power feeding portion is kept stationary.

(4) A high frequency at the resonance point, as well as high gain and small Q at the resonance point, is ensured thanks to the use of the special resilient members and rare earth magnet.

What is claimed is:

1. An actuator for use in a pickup device for a video disk player, said actuator comprising:

a cylindrical yoke made from a soft magnetic material, said yoke being provided with an axially extending notch having an opening at one axial end of said yoke, a pair of tubular solenoid coils disposed in said yoke such that when said pair of solenoid coils is energized the same polarity appears at adjacent portions thereof, a movable element being disposed within said solenoid coils for axial movement, said movable element including an axially magnetized permanent magnet and a pair of pole shoes attached to the respective ends of said permanent magnet, a pair of resilient members, each of said resilient members being respectively attached to opposite axial ends of said yoke, a pair of projections, each of said projections being provided on the respective axial ends of said movable element to axially extend therefrom, said projections being respectively supported by said resilient members coaxially with said yoke, a bobbin made from an insulating material and mounted in said yoke to enclose said solenoid coils, and a terminal block projecting radially outward from said bobbin, said terminal block including a base portion and a terminal pin supporting portion being a width greater than a width of said base portion.

2. An actuator as claimed in claim 1, characterized in that a gap is provided between said terminal block and said yoke.

3. An actuator as claimed in claim 1, further comprising a permanent magnet attached to the outer end of one of said projections and adapted for magnetically attracting a magnetic portion of a stylus.

4. An actuator as claimed in claim 3, wherein said projections are made of plastic.

5. An actuator as claimed in claim 4, wherein a rare earth cobalt magnet of $RCO_5$ group is used as said permanent magnet.

6. An actuator as claimed in claim 5, wherein an anisotropic plastic magnet is used as said permanent magnet for magnetically attracting the magnetic portion of the stylus.

7. An actuator as claimed in claim 6, wherein said resilient member has a thickness falling between 0.2 and 0.5 mm and an outer diameter of said resilient member is determined to fall between 2.5 and 3.0 times as large as a diameter of a bore formed in said resilient member for supporting the projection.

8. An actuator as claimed in claim 7, wherein said resilient member is formed from a butyl rubber having a 25% modulus ranging between 2 and 6 $Kg/cm^2$ and a restitution elasticity modulus ranging between 7 and 21%.

9. An actuator as claimed in claim 3, characterized in that a gap is provided between said terminal block and said yoke.

10. An actuator as claimed in claim 3, wherein an anisotropic plastic magnet is used as said permanent magnet for magnetically attracting the magnetic portion of the stylus.

11. An actuator as claimed in claim 1, wherein said resilient member has a thickness falling between 0.2 and 0.5 mm and an outer diameter of said resilient member is determined to fall between 2.5 and 3.0 times as large as a diameter of a bore formed in said resilient member for supporting the projection.

12. An actuator as claimed in claim 1, 10 or 11, wherein said resilient member is formed from a butyl rubber having a 25% modulus ranging between 2 and 6 $Kg/cm^2$ and a restitution elasticity modulus ranging between 7 and 21%.

13. An actuator as claimed in claim 1, wherein said projections are made of plastic.

14. An actuator as claimed in claim 1 or 13, wherein a rare earth cobalt magnet of $RCO_5$ group is used as said permanent magnet.

* * * * *